(12) United States Patent
Lin

(10) Patent No.: US 8,009,973 B2
(45) Date of Patent: Aug. 30, 2011

(54) PORTABLE ELECTRONIC DEVICE

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/774,698

(22) Filed: May 5, 2010

(65) Prior Publication Data

US 2011/0142432 A1 Jun. 16, 2011

(30) Foreign Application Priority Data

Dec. 16, 2009 (CN) .......................... 2009 1 0311626

(51) Int. Cl.
*G03B 17/00* (2006.01)
(52) U.S. Cl. .......................... 396/71; 396/73
(58) Field of Classification Search .................... 396/71, 396/73
See application file for complete search history.

(56) References Cited

U.S. PATENT DOCUMENTS

| 5,389,988 | A | * | 2/1995 | Daitoku ......................... 396/60 |
| 6,924,948 | B2 | * | 8/2005 | Oshima et al. ................ 359/754 |
| 2007/0115567 | A1 | * | 5/2007 | Eguchi et al. ................. 359/822 |
| 2008/0316619 | A1 | * | 12/2008 | Yu .................................... 359/811 |
| 2009/0225405 | A1 | * | 9/2009 | Fujimoto ...................... 359/356 |

* cited by examiner

*Primary Examiner* — Clayton E LaBalle
*Assistant Examiner* — Dennis Hancock
(74) *Attorney, Agent, or Firm* — Altis Law Group, Inc.

(57) ABSTRACT

A portable electronic device includes a main body defining a receiving cavity therein, a camera module received in the receiving cavity, and a movable moveable lens. The camera module includes a casing and a wide-angle lens unit received in the casing. The movable lens is received in the receiving cavity and spaced a distance from the camera module. The movable lens is movable between a first position where the wide-angle lens unit is covered by and optically aligned with the movable lens, thereby the movable lens and the wide-angle lens unit cooperatively constituting a telephoto lens, and a second position where the wide-angle lens unit is misaligned with the movable lens and exposed to an exterior.

7 Claims, 5 Drawing Sheets

PORTABLE ELECTRONIC DEVICE

BACKGROUND

1. Technical Field

The present disclosure relates to portable electronic devices, and more particularly to a portable electronic device having a camera module.

2. Description of Related Art

Camera modules are often provided in mobile telephones, personal digital assistants or other portable electronic devices, allowing convenient and practical image capture capability.

The portable electrical devices are increasingly small and compact, such that accommodating space for the camera module is limited. As a result, camera modules providing predetermined focus are often used. Such a camera module is permanently fixed in the portable electronic device, and includes a lens barrel, a lens unit received in the lens barrel, an image sensor, and a lens actuator for driving the lens unit moving relatively to the image sensor to reach a desired focal position.

However, optical zoom ratio of the camera module with predetermined focus is limited. If a closeup image of a subject adjacent to the camera module is attempted without moving physically closer, the captured image can be unclear.

It is thus desirable to provide a portable electronic device which can overcome the described limitations.

DETAILED DESCRIPTION

Figure 1:
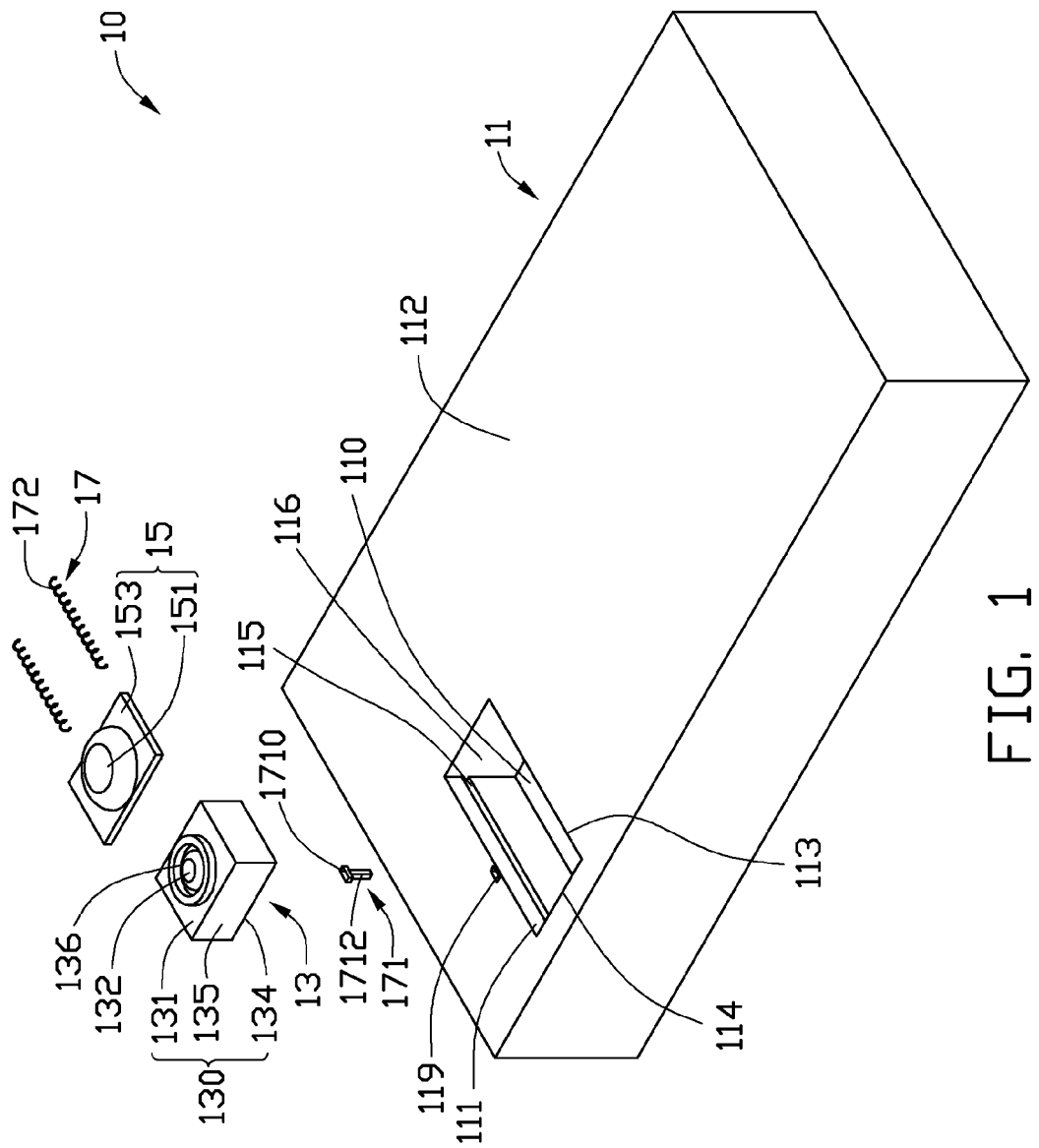
FIG. 1 is an exploded, isometric view of a portable electronic device according to an exemplary embodiment of the present disclosure.

Reference will now be made to the drawing figures to describe an embodiment of the present portable electronic device in detail.

FIG. 1 shows a portable electronic device 10 according to an exemplary embodiment. The portable electronic device 10 includes a main body 11, a camera module 13, a moveable lens 15 and a fixing unit 17. The portable electronic device 10 can be a mobile telephone, a personal digital assistant, a notebook computer or other. In this embodiment, the portable electronic device 10 is a mobile telephone.

The main body 11 defines a receiving cavity 110 receiving the camera module 13, the moveable lens 15 and the fixing unit 17 therein. The receiving cavity 110 is cuboid, and concave. The main body 11 includes four walls, a front sidewall 111, a rear sidewall 113, a left sidewall 114 and a right sidewall 116, surrounding four sides of the receiving cavity 110, respectively. The front and rear sidewalls 111, 113 are located at front and rear sides of the receiving cavity 110, respectively, and extend along a length thereof. The left and right sidewalls 114, 116 are located at left and right sides of the receiving cavity 110, respectively, and extend along a width of the receiving cavity 110. A pair of guide grooves 115 are defined in top portions of the front and rear sidewalls 111, 113, respectively. Each of the guide grooves 115 extends along the length of the receiving cavity 110. The guide grooves 115 communicate with the receiving cavity 110. The guide grooves 115 are parallel to the outside surface 112 of the main body 11, and located at the same level with respect to the outside surface 112 of the main body 11. Each guide groove 115 connects the left sidewall 114 with the right sidewall 116. A through hole 119 is defined in a position of the main body 11 adjacent to the front sidewall 111. The through hole 119 is located substantially halfway along the length of the front sidewall 111. The though hole 119 extends downwardly from the outside surface 112 of the main body 11 to communicate with the guide grooves 115 of the front sidewall 111. The through hole 119 is perpendicular to the guide grooves 115.

The camera module 13 includes a hollow cuboid casing 130 and a wide-angle lens unit 132 received in the casing 130. The casing 130 is shorter than the receiving cavity 110, and substantially equal in width to the receiving cavity 110. The casing 130 includes a rectangular top plate 131, a rectangular bottom plate 134 spaced from and parallel to the top plate 131 and four side plate 135 connecting the top plate 131 with the bottom plate 134. A thickness of the camera module 13 is less than a depth of a lower of the receiving cavity 110 beneath the guide grooves 115. A circular opening 136 is defined in a centre of the top plate 131 of the casing 130 through which the lens unit 132 telescopically extends during operation of the camera module 13.

The moveable lens 15 includes a fixing portion 153 and a circular optical portion 151 located on a central portion of the fixing portion 153. The fixing portion 153 has a rectangular outline. A sum of a length of the fixing portion 153 and the length of the casing 130 is less than the length of the receiving cavity 110. The fixing portion 153 is wider than the receiving cavity 110, such that the moveable lens 15 can be mounted in the receiving cavity 110 via front and rear ends of the fixing portion 153 received in the guide grooves 115, respectively. A thickness of the fixing portion 153 is less than a height of the guide grooves 115. Thus, the moveable lens 15 can move horizontally along the receiving cavity 110 with the front and rear ends of the fixing portion 153 sliding along the guide grooves 115. The optical portion 151 is a positive lens with positive refracting power for focusing light passing therethrough. In this embodiment, the optical portion 151 of the moveable lens 15 is a convex lens. A diameter of the optical portion 151 is substantially equal to that of the opening 136 of the casing 10.

The fixing unit 17 includes a holding member 171 and two spring elements 172. The holding member 171 includes a rectangular button 1710 and an elongated post 1712 extending perpendicular to one side of the button 1710. The button 1710 is larger than the through hole 119 of the main body 11. The post 1712 is substantially the same shape as and smaller than the though hole 119 of the main body 11, such that the post 1712 can be loosely received in the through hole 119. Each spring element 172 includes one end configured to connect one of the left and right sidewalls 114, 116 and another end configured to connect the fixing portion 153 of the moveable lens 15.

When assembled, the camera module 13 is fixedly received in the lower portion of a left end of the receiving cavity 110, with three of the four side plates 135 of the casing 130 contacting the front sidewall 111, the left sidewall 114 and the rear sidewall 116 respectively, remaining the other side plate 135 facing and spaced a distance from the right sidewall 113.

The moveable lens 15 is mounted in the receiving cavity 110 via the front and rear ends thereof slidably engaged in the guide grooves 115, respectively. Since the camera module 13 is shorter than the lower portion of the receiving cavity 110 beneath the guide grooves 115, the top plate 131 of the camera module 13 is lower than the guide grooves 115 after the camera module 13 is received in the receiving cavity 110. The moveable lens 15 is above the camera module 13 and spaced a distance from the top plate 131 thereof. The moveable lens 15, moveable along the guide grooves 115, can be received in the left end of the receiving cavity 110 where the lens unit 132 of the camera module 13 is covered by and optically aligned with the moveable lens 15 or in a right end of the receiving cavity 110 where the lens unit 132 of the camera module 13 is misaligned with the movable lens 15 and exposed to an exterior. When the moveable lens 15 is aligned with the camera module 13, the movable lens 15 and the lens unit 132 are cooperatively constituting a telephoto lens.

Figure 4:
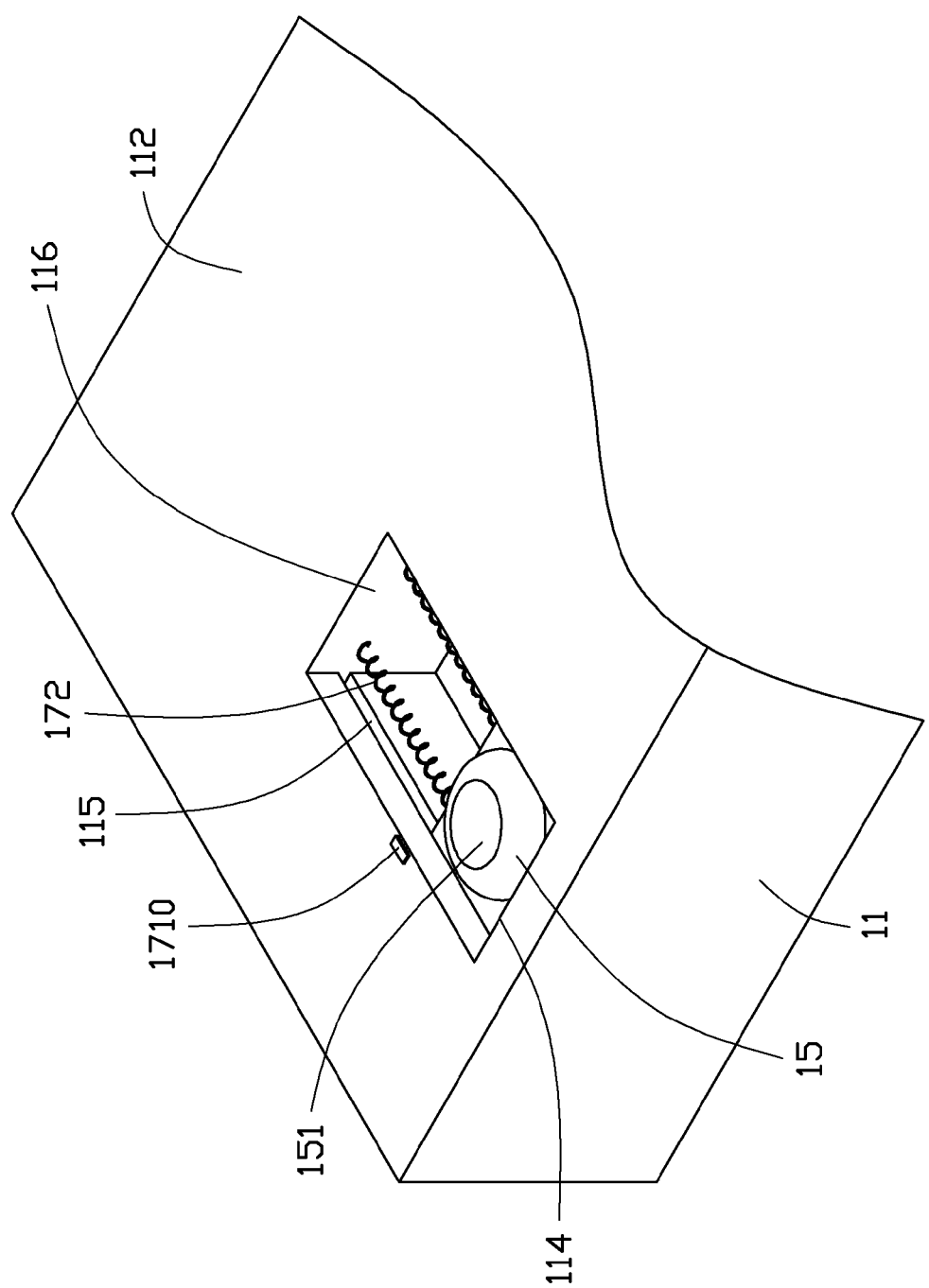
FIG. 4 is a view similar to FIG. 2, but showing the portable electronic device configured for capturing an image of a close subject.

The post 1712 of the holding member 171 is loosely received in the through hole 119 of the main body 11. The button 1710 protrudes out of the through hole 119. The holding member 171 can move downwardly/upwardly along the through hole 119 toward or away from the guide groove 115 by force applied on the button 1710, such that a bottom end of the post 1712 can alternatively move downwardly to protrude in the guide groove 115 and upwardly to be received in the through hole 119. The spring elements 172 are connected between the right sidewall 116 and a right side of the fixing portion 153 of the moveable lens 15. When the moveable lens 15 is received in the left end of the receiving cavity 110 to optically aligned with the moveable lens 15 of the camera module 13, the spring elements 172 are relaxed (as shown in FIG. 4). The fixing unit 17 is located at a right side of the camera module 13.

Figure 2:
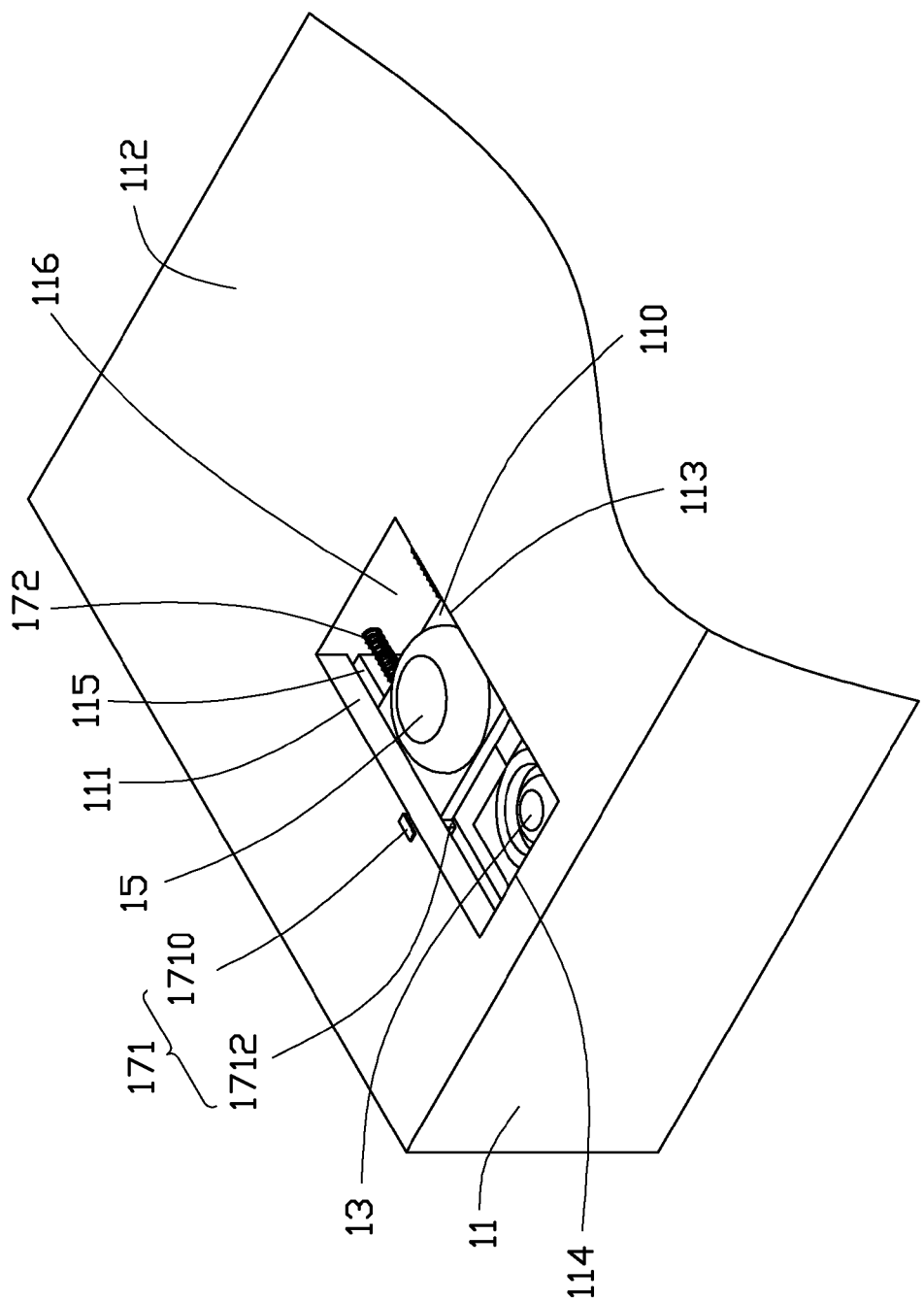
FIG. 2 is an assembled cutaway view of the portable electronic device of FIG. 1, configured to capture a distant image.
Figure 3:
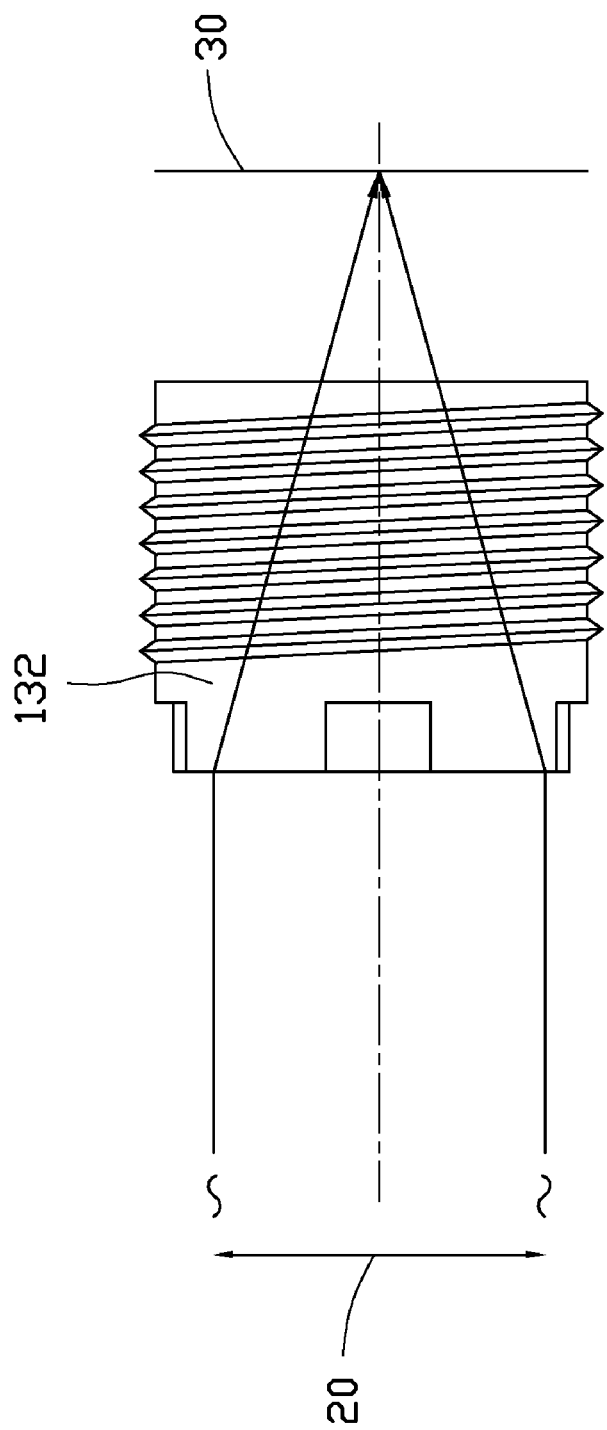
FIG. 3 is a view schematically showing the portable electronic device capturing an image of the distant subject.

Referring to FIG. 2, when the portable electronic device 10 captures an image of a distant subject 20 far from the camera module 13, the moveable lens 15 is moved away from the left end of the receiving cavity 110 to the right side of the camera module 13 and received in the right end of receiving cavity 110. The spring elements 172 are compressed. Thus, an elastic force due to the deformation of the spring elements 172 is applied to the fixing portion 153 of the moveable lens 15, such that the moveable lens 15 has a tendency to move back towards the left end of the receiving cavity 110. The button 1710 of the holding member 171 is pressed to force the holding member 171 downwardly to the guide groove 115. Thus, the bottom end of the post 1712 abuts a left side of the fixing portion 153 for stopping and maintaining the moveable lens 15 at the right side of the camera module 13. Referring to FIG. 3, the portable electronic device 10 captures an image of the distant subject 20 via the lens unit 132 of the camera module 13 only. The image of the distant subject 20 is formed at an image plane 30 of the camera module 13.

Referring to FIG. 4, when the portable electronic device 10 captures an image of a close subject 21 located adjacent to the camera module 13, the button 1710 of the holding member 171 is forced upwardly to leave the guide groove 115. Thus, the spring elements 172 resume a relaxed state to impel the moveable lens 15 towards the camera module 13 until the moveable lens 15 is aligned with the camera module 13. At this moment, the button 1710 of the holding member 171 is pressed to force the bottom end of the post 1712 downwardly to protrude in the guide groove 115 again. Therefore, the bottom end of the post 1712 abuts the right side of the fixing portion 153 for stopping and maintaining the moveable lens 15 aligned with the camera module 13. The optical portion 151 of the moveable lens 15 is coaxially arranged with the lens unit 132 of the camera module 13. Thus, the camera module 13 captures an image of the close subject 21 via the telephoto lens comprising the lens unit 132 and the moveable lens 15 cooperatively. Since the moveable lens 15 has positive reflective power, the moveable lens 15 can shorten a back focus length of the camera module 13, which forms the image of the close subject 21 at the image plane 30 of the camera module 13.

Figure 5:
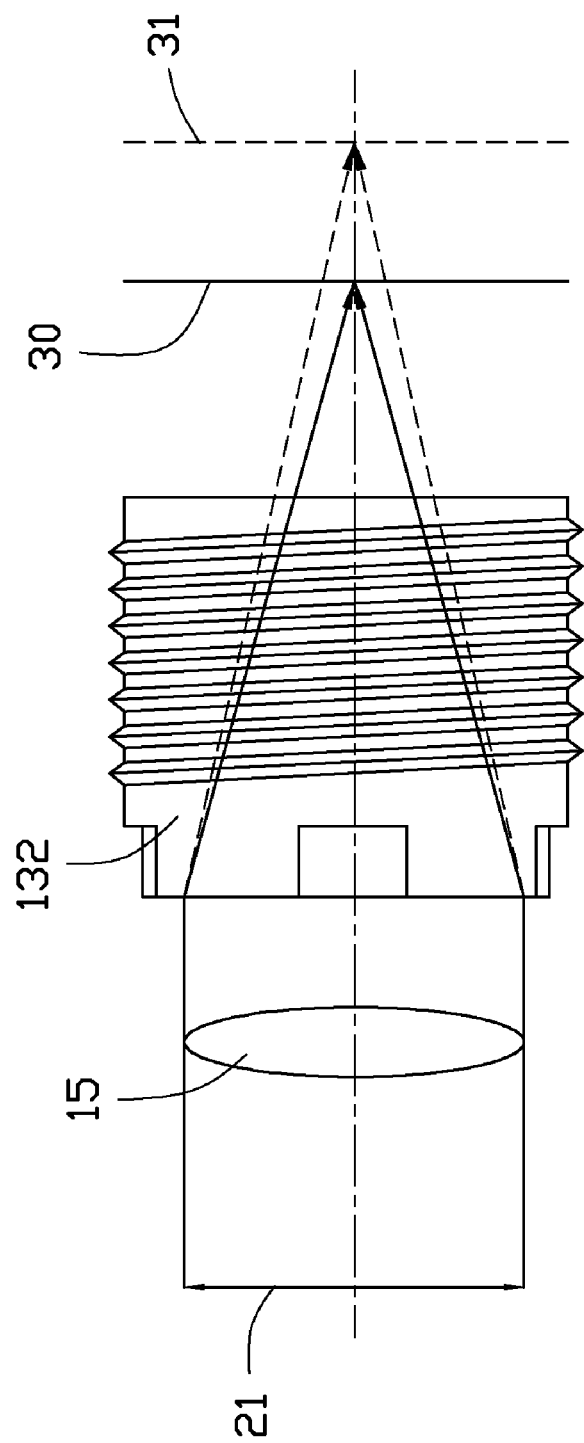
FIG. 5 is a view schematically showing the portable electronic device capturing an image of the close subject.

Referring to FIG. 5, if distance between the close subject 21 and the lens unit 132 is ten centimeters, an image of the close subject 21 formed by the lens unit 132 only at a surface 31 behind the image plane 30, resulting in blurred image. However, when capturing the image of the close subject 21 via the lens unit 132 and the moveable lens 15 cooperatively, the image of the close subject 21 is formed at the image plane 30 to obtain a clear image.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device, comprising:
    a main body defining a receiving cavity therein, and comprising four sidewalls surrounding the receiving cavity, a pair of guide grooves defined in two of the four sidewalls at two opposite sides of the receiving cavity, respectively, the camera module fixedly received in the receiving cavity and the movable lens slidably engaged in the guide grooves;
    a camera module received in the receiving cavity of the main body, the camera module comprising a casing and a wide-angle lens unit received in the casing;
    a movable lens received in the receiving cavity and spaced a distance from the camera module, the movable lens being movable between a first position where the wide-angle lens unit is covered by and optically aligned with the movable lens, thereby the movable lens and the wide-angle lens unit cooperatively constituting a telephoto lens, and a second position where the wide-angle lens unit is misaligned with the movable lens and exposed to an exterior; and
    a holding member comprising a button and a post extending outwardly from the button, the main body defining a through hole adjacent to the receiving cavity through which the post of the holding member extends, the through hole communicating with one of the guide grooves, and the holding member movable along the through hole toward or away from the guide groove.

2. The portable electronic device of claim 1, wherein each guide groove communicates with the receiving cavity, and two opposite ends of the movable lens are received in the guide groove, respectively.

3. The portable electronic device of claim 2, wherein the camera module is received in a lower portion of the receiving cavity beneath the guide grooves.

4. The portable electronic device of claim 1, further comprising a spring element connected between the movable lens and the main body, wherein when the spring element is relaxed, the movable lens is aligned with the camera module and the post abuts against a first side of the movable lens, when the movable lens is moved off from the camera module, the spring element is compressed, the post abuts against an opposite second side of the movable lens.

5. The portable electronic device of claim 1, wherein the movable lens comprises a central optical portion and a fixing portion surrounding the optical portion, with two opposite ends of the fixing portion received in the guide grooves, respectively.

6. The portable electronic device of claim 5, wherein the casing defines an opening through which the wide-angle lens unit extends, and the optical portion of the moveable lens has substantially the same size as that of the opening.

7. The portable electronic device of claim 5, wherein the optical portion of the movable lens is convex.

* * * * *